United States Patent [19]
Yang et al.

[11] Patent Number: 6,140,379
[45] Date of Patent: Oct. 31, 2000

[54] CHEMICALLY EMBOSSED METALLOCENE POLYETHYLENE FOAM

[75] Inventors: Li-Ying T. Yang, Whippany, N.J.; Martin Dees, Landisville, Pa.

[73] Assignee: Armstrong World Industries, Inc., Lancaster, Pa.

[21] Appl. No.: 09/206,730

[22] Filed: Dec. 7, 1998

[51] Int. Cl.$^7$ ........................................... C08J 9/10
[52] U.S. Cl. ................... 521/85; 521/88; 521/89; 521/90; 521/92; 521/93; 521/94; 521/97
[58] Field of Search ................... 521/85, 94, 79, 521/92, 93, 89, 88, 97, 90

[56] References Cited

U.S. PATENT DOCUMENTS

| | | | |
|---|---|---|---|
| 3,293,094 | 12/1966 | Narin et al. | 156/79 |
| 3,293,108 | 12/1966 | Narin et al. | 428/159 |
| 4,407,882 | 10/1983 | Hauser et al. | 428/159 |
| 4,522,785 | 6/1985 | D'Errico | 422/12 |
| 5,407,617 | 4/1995 | Oppermann et al. | 264/46.4 |
| 5,441,563 | 8/1995 | Sideman et al. | 106/224 |
| 5,733,630 | 3/1998 | Frisch et al. | 428/159 |
| 5,763,501 | 6/1998 | Bickhardt et al. | 521/142 |
| 5,883,144 | 3/1999 | Bambara et al. | 521/144 |

FOREIGN PATENT DOCUMENTS

| | | |
|---|---|---|
| 1511593 | 5/1978 | United Kingdom . |
| 1514359 | 6/1978 | United Kingdom . |
| WO 96/04419 | 2/1996 | WIPO . |

*Primary Examiner*—Morton Foelak
*Attorney, Agent, or Firm*—Womble, Carlyle, Sandridge & Rice

[57] ABSTRACT

A textured metallocene polyethylene foam sheet suitable for use in a floor covering is made using a highly co-activated azodicarbonamide package which blows the metallocene polyethylene effectively. The preferred co-activators are zinc oxide and urea. The textured surface of metallocene polyethylene foam is formed by a chemical embossing process which utilizes a liquid triazole having an alkyl moiety as a foam-expansion inhibitor. The triazole is dissolved in a non-polar solvent to form the foam inhibitor. The preferred inhibitor is a hydrocarbon which may be halogenated.

16 Claims, No Drawings

CHEMICALLY EMBOSSED METALLOCENE POLYETHYLENE FOAM

FIELD OF THE INVENTION

This invention relates to making a chemically embossed metallocene polyethylene (MPE) foam using a highly co-activated blowing agent of azodicarbonamide and an alkyl functionalized triazole derivative as an inhibitor. The alkylamino group of this liquid azole makes it readily dissolvable in non-polar inks which gives good adhesion to MPE surfaces. The compatibility of the hydrocarbon structure also increases permeation of the inhibitor into the polyethylene composition. The initial effort showed normally activated azodicarbonamides were not able to blow MPE. Use of a highly co-activated azodicarbonamide and a liquid azole compound in the present invention yield an unusually excellent textured MPE foam.

BACKGROUND OF THE INVENTION

Sheets of cellular resinous composition have been widely used as decorative surface coverings. It is well known to those skilled in the art that foamed polymer sheets may be textured by the process commonly referred to as "chemical embossing". Such chemical embossing techniques have normally involved coating/calendering a base material, such as a paper felt with a foamable polymer layer. A chemical blowing agent is normally uniformly dispersed in the foamable layer and is adapted, upon subsequent heating to a sufficiently elevated temperature, to decompose and to liberate gaseous decomposition products to expand and create the foamed product. For chemically embossed sheets, the surface of a foamable polymer is printed with an ink composition containing an agent which inhibits foaming in the printed areas when the foamable polymer composition is subsequently subjected to a heat treatment. The areas which have not been printed over thus expand normally on heating while expansion in the printed areas containing the inhibitor is suppressed, resulting in a textured surface with depressions in those areas printed with the inhibiting ink.

The most frequently used polymers in the preparation of resilient sheet flooring are polyvinyl chloride (PVC) and vinyl chloride copolymers. Each layer in a composite sheet structure provides unique functions for an overall performance. A foamable layer made of PVC has certain disadvantages such as poor strength and low elastic recovery, and there is accordingly need for an alternate foamable layer. It has now been found that a particular class of polyethylene-metallocene polyethylene (single site catalyst-based polyolefin resin) can provide excellent features for a foamable layer for flooring. It would be desirable to provide an economical way to produce an embossed MPE foam layer for commercial production.

The structure of cellular gas-filled polymers can be formed either by foaming a polymer system, by introducing gas-filled microspheres (microballons) into a system, or by extracting material by a post-treatment, resulting in the formation of cells or pores. The method of foaming is the one most generally employed for making polymers with a cellular structure. Based on the mechanism by which gas is liberated, the compounds used for foaming polymers may be classified as chemical and physical blowing agents. Chemical blowing agents (CBA) are individual solid compounds or mixtures of solid compounds that liberate gas as a result of chemical reactions, including thermal decomposition, or as a result of chemical reactions of chemical blowing agents. Physical blowing agents are liquid compounds that gasify as a result of physical process (evaporation, desorption) at elevated temperatures or reduced pressures.

A chemically embossed foam utilizes a chemical blowing agent. The blowing agents which have found the most wide-spread use are those compounds having the >N—N< or —N=N— linkages which decompose at elevated temperature to yield an inert gas high in nitrogen. Hereinafter, such blowing agents shall be referred to as "nitrogen containing blowing agents". One example of a nitrogen containing blowing agent is azodicarbonamide (or "azo"). Nitrogen has a low permeability in polymers. Decomposition is a function of chemical activation, particle size and temperature. It is common practice to add accelerators into the compositions to accelerate the decomposition of the blowing agents, reduce the decomposition temperature and/or narrow the decomposition temperature range. Typical activators for azo blowing agents include acids, bases, metal organic salts, oxides, amines and urea, etc.

One critical requirement to be taken into account when selecting a chemical blowing agent is that the temperature of decomposition of the CBA must be close to the melting point and the hardening temperature of polymer. It would be desirable to find a suitable blowing agent and activators for a metallocene polyethylene, which has a low melting/softening temperature around 60° C. (lower than 100° C.).

The inhibitor for the blowing agent is applied to one surface of the resinous polymer composition in any desired area. The inhibitor is preferably applied in a liquid carrier which allows better control of the concentration of inhibitor applied. The inhibitor composition is conveniently formulated in the manner of a printing ink. The effectiveness of inhibition depends on the permeability (solubility and diffusion) of the inhibitor in a printing ink to the foam substrate. Polyethylene is not permeable to many solids and liquid organic and inorganic materials.

A wide range of compounds have been claimed to act as inhibitors for chemical embossing foam of floor and wall covering surfaces. The choice of an inhibitor for the blowing agent will depend on the particular blowing agent utilized in the system. Triazole compounds such as benzotriazole (BTA) and tolyltriazole (TTA) are widely used in solvent-based inks for chemically embossing foam made by azo blowing agents. However, their use in non-polar inks which give good adhesion to polyethylene surfaces, is limited by a lack of solubility. Therefore, these widely used inhibitors are of limited utility in polyethylene systems. It would be desirable to provide an inhibitor which is soluble or compatible in a non-polar ink, and has a high penetration rate into polyethylene for producing chemical embossing foam of MPE.

SUMMARY OF THE INVENTION

According to the present invention, there is a novel activated chemical blowing agent for use in making a metallocene polyethylene foam sheet suitable as a floor covering. The novel chemical blowing agent is a highly co-activated blowing agent comprising a nitrogen containing blowing agent, preferably azodicarbonamide, and at least two activators. Activators comprise citric acid, oxalic acid, p-toluene sulfonic acid, phosphoric acid, potassium carbonate, borax, triethanol amine, zinc chloride, zinc acetate, zinc oxide, zinc stearate, barium stearate, calcium stearate, urea, and polyethylene glycol. The preferred co-activators for this invention are zinc oxide and urea. The compositions of the activators are generally from about 10% to 70% by weight of the azodicarbonamide, preferably from 20% to 50%, and more preferably from about 35% to 45%. Preferably, the co-activator has the composition ratio for co-activators of 2:1 to 1:2 when two activators are used, and most preferably about 1:1, although ratios of 10:1 to 1:10 can also be useful.

In accordance with the invention, a process and composition are provided for making a foam-growth-controlling printing ink composition for use in chemical embossing of foamable metallocene polyethylene sheets. The printing ink composition comprises a thermoplastic binder resin, a non-polar solvent, an optional pigment, and an inhibitor package for preventing the foaming of the foamable materials containing the nitrogen containing blowing agent. The inhibitor package is a triazole compound of the formula:

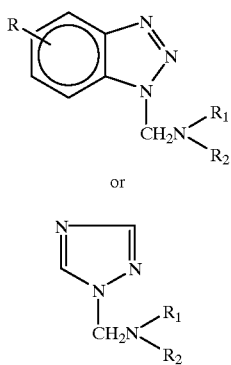

where R can be hydrogen, one or more aliphatic moieties containing up to 20 carbon atoms, one or more cycloaliphatic moieties containing from 3 to 20 carbon atoms, or one or more aryl or substituted aryl groups containing from 6 to 30 carbon atoms and attached by a single bond to any or all of the atoms in the benzenoid ring moiety of the benzotriazole. $R_1$ and $R_2$ are the same or different and each can be an aliphatic moiety containing from 2 to 20 carbon atoms, a cycloaliphatic moiety containing from 3 to 20 carbon atoms or an aryl or substituted aryl moiety containing from 6 to 30 carbon atoms. Straight or branched alkylene radicals having 2 or 3 carbon atoms are preferred. Structures such as the above show excellent permeability into metallocene polyethylene. The preferred solvents to be used in the printing ink include hydrocarbon solvents based on aliphatic, cycloaliphatic, and aromatic hydrocarbons where the molecular structures may contain carbon—carbon single, and/or double bonds. Examples would be petroleum ethers or naphthas, benzene, toluene, xylene, cumene, ethylbenzene, trimethylbenzene. Broadly defined, any of the above materials with boiling point below 400° F. at ambient pressure are acceptable. Halogenated materials of the above families may also be used. The preferred non-polar solvents have a Hildebrand parameter ($\delta/MP^{1/2}$) of less than 16.

A further object of the invention is to provide a method of embossing a heat-foamable metallocene polyethylene material by applying the printing ink compositions of the invention to selected areas of the surface of a heat-foamable polymer containing a blowing agent, and the subsequently heating said material to above the decomposition temperature of the blowing agent.

It is thought that the embossing effect is caused by a reaction taking place between the inhibitor and the blowing agent/activator complex. The blowing agent/activator has a decomposition temperature below the blowing agent itself. The inhibitor reaction with the blowing agent/activator complex causes the decomposition temperature to increase and therefore areas treated with an effective inhibitor do not experience the same evolution of gas as those areas not treated with an inhibitor if the temperature is properly controlled. It is believed that the effectiveness of inhibition in flexible vinyl foams is associated with solubility or diffusibility in the foamable composition. Furthermore, it is believed that this solubility could be due largely to the presence of plasticizer in the composition. A further object of this invention is to provide a good inhibition effect without any plasticizer in the composition.

DETAILED DESCRIPTION OF THE INVENTION

This invention provides a method to make a chemically embossed metallocene polyethylene foam sheet suitable for floor coverings. These elastic, substantially linear ethylenic polymers have unusual properties, including an unusual combination of properties, which leads to enhanced processability of the novel polymers. The metallocene ethylenic polymers have processability similar to highly branched low density polyethylene, but the strength and toughness is similar to linear low density polyethylene. Another feature of the polyethylene resins used in the present invention is that they do not require the use of a plasticizer thereby significantly reducing environmental problems caused by the migration of liquid plasticizers out of the material and/or loss of property associated with the use of plasticizers.

A single site catalyst-based polyethylene for the present invention is generally produced by polymerization of ethylene monomers in the presence of particular single sited catalysts which restrict the progress of the polymerization and are known as metallocenes. The metallocene polymers have a relatively narrow molecular weight distribution (MWD) and a small amount of long chain branching. The metallocene polyethylene comprising ethylene homopolymers or a copolymer of ethylene with at least one $C_3$ to $C_{20}$ alpha-alkene comonomer are especially preferred. Suitable comonomers include 1-propene, isobutylene, 1-butene, 1-hexene, 4-methyl-pentene, 1-octene, styrene, and halo- or alkyl substituted styrenes. Other properties of metallocene polyethylenes include: a) a density preferably from about 0.85 grams/cubic centimeter (g/cm³) to about 0.97 g/cm³; b) a melt index, $I_2$, from about 0.01 grams/10 minutes to about 1000 grams/10 minutes, preferably from about 0.1 grams/10 minutes to 100 grams/10 minutes, and especially preferably from 0.5 grams/10 minutes to 10 grams/10 minutes; c) preferably a melt flow ratio, $I_{10}/I_2$, from 7 to about 20; and d) a molecular weight distribution ($M_w/M_n$) preferably about 3.5 or less, more preferably form about 1.5 to about 2.5, and most preferably from about 1.7 to about 2.3.

Throughout this disclosure, "melt index" or "$I_2$" is measured in accordance with ASTM D-1238 (190° C./2.16 kg); "$I_{10}$" is measured in accordance with ASTM D-1238 (190° C./10 kg).

Excellent teachings of processes for making polyethylene foam are reported in C. P. Park, "Polyolefin Foam", Chapter 9, *Handbook of Polymer foams and Technology*, edited by D. Klempner and K. C. Frisch, Hanser Publishers, Munich, Vienna, New York, Barcelona (1991), which are incorporated herein by reference.

The foam material of the invention may be prepared by melt blending a metallocene ethylenic polymer material and a decomposable chemical blowing agent in an intensive mixer such as a Banbury mixer or an extruder, to form a foamable compound. The chemical blowing agent is preferably dry-blended with the polymer material prior to heating the polymer material to a melt form, but may also be added when the polymer material is compounded.

Cross-linking may be induced by addition of a cross-linking agent or by radiation. Induction of cross-linking and exposure to an elevated temperature to effect foaming or expansion may occur simultaneously or sequentially. If a cross-linking agent is used, it is preferably incorporated into the polymer material in the same manner as the chemical blowing agent. Further, if a cross-linking agent is used, the foamable melt polymer material is processed at a temperature of preferably less than 150° C. to prevent decomposition of the cross-linking agent or the blowing agent and to prevent premature cross-linking. The compounded material is conveyed to a mill or calender to form a foamable sheet which is then cross-linked and expanded to an elevated temperature of 150–220° C. such as in an oven to form the foam sheet. If radiation cross-linking is used, the foamable sheet is irradiated to cross-link the polymer material and then expanded at the high temperature as described above. Other ingredients in the present foam compositions include fillers/extenders, pigments, heat and light stabilizers, lubricants, etc.

Blowing agents useful in making the present foam sheet include decomposable chemical blowing agents. Such chemical blowing agents decompose at elevated temperatures to form gases or vapors to blow the polymer into cellular foam. Chemical blowing agents include azodicarbonamide, azodiisobutyro-nitrile, benzenesulfonhydrazide, p, p'-oxybis(benzene sulfonyl hydrazide), and p-toluene sulfonyl hydrazide. A highly co-activated azodicarbonamide is preferred to produce chemically embossed foam of metallocene polyethylene. The preferred co-activators for this invention are zinc oxide and urea. The compositions of the activators are generally from about 10% to 70% by weight of the azodicarbonamide, preferably from 20% to 50% and most preferably from about 35% to 45%. Preferably, the co-activator has the composition ratio for the co-activators of 2:1 to 1:2 when two activators are used, more preferably about 1:1, although ratios of 10:1 to 1:10 can also be useful.

Cross-linking agents useful in making the present foam sheet are the organic peroxides. Useful organic peroxides cross-linking agents include dicumyl peroxide, 1,1-di-(tert-butylperoxy)-3,3,5-trimethylcyclohexane, butyl 4,4-di-(tert-butylperoxy) valerate, 2,5-Dimethyl-2,5-di-(tert-butylperoxy)hexane-3 and 2,5-Dimethyl-2,5-di-(tert-butylperoxy)hexane. Dicumyl peroxide is the preferred agent.

Those skilled in the art will recognize that a very wide range of printing ink compositions exist with varying combinations of resin binders, pigments, inhibitors and viscosity-control additives. The pigments are optional, since it may be desirable to use a colorless, inhibitor containing printing ink.

The following examples are set forth to illustrate the preparation and advantages of metallocene polyethylene foam sheets, the preparation of printing ink formulations, and demonstration of the foaming and chemical embossing behavior of the claimed compounds. The examples should not be construed to limit the scope of the invention. Unless otherwise indicated, all parts and percentages given in the Examples are on a weight basis.

Comparative Examples 1 and 2 demonstrate normally activated azodicarbonamides were not able to blow MPE.

COMPARATIVE EXAMPLE 1

A foamable metallocene polyethylene sheet was formulated by mixing the following ingredients on a two-roll mill at the roll temperatures of 95–105° C.:

| Ingredients | Parts |
|---|---|
| MPE Resin, melt index of 0.5, density of 0.8680 g/cm$^3$ | 100 |
| Calcium Carbonate | 30 |
| Titanium Dioxide | 5 |
| 1,1-Di-(tert-Butylperoxy)-3,3,5-Trimethylcyclohexane | 0.4 |
| Azodicarbonamide | 2 |
| Zinc Oxide | 0.7 |
| Lubricant | 2 |

This foamable sheet was heated at 200° C. in a hot air oven for 5 minutes. No expansion was observed.

COMPARATIVE EXAMPLE 2

A foamable metallocene polyethylene sheet was formulated by mixing the following ingredients on a two-roll mill at the roll temperatures of 95–105° C.:

| Ingredients | Parts |
|---|---|
| MPE Resin, melt index of 5, Density of 0.8799 g/cm$^3$ | 100 |
| Calcium Carbonate | 35 |
| Titanium Dioxide | 10 |
| Dicumyl peroxide | 0.5 |
| Azodicarbonamide | 2 |
| Zinc Oxide | 1.1 |
| Glycerol Mono Stearate Lubricant | 2 |

This foamable sheet was heated at 190° C. in a hot air oven for 3 minutes. No expansion was observed.

EXAMPLE 1

A foamable metallocene polyethylene sheet was formulated by mixing the following ingredients on a two-roll mill at the roll temperatures of 95–105° C.:

| Ingredients | Parts |
|---|---|
| MPE Resin, melt index of 5, density of 0.8700 g/cm$^3$ | 80 |
| EVA | 20 |
| Calcium Carbonate | 35 |
| Titanium Dioxide | 7.5 |
| 1,1-Di-(tert-Butylperoxy)-3,3,5-Trimethylcyclohexane | 0.8 |
| Highly Co-Activated Azodicarbonamide | 2.5 |
| Zinc Stearate Lubricant (and Activator) | 0.75 |

The highly co-activated azodicarbonamide is 60% azodicarbonamide by weight and 40% of zinc oxide and urea co-activators. The average diameter of the highly co-activated azodicarbonamide package was about 3.8 microns as measured with a laser (about 2 or 3 microns using the Fisher measurement). The azo, zinc oxide and urea were compounded (ground) together. The decomposition temperature of this highly co-activated azodicarbonamide package is 150° C. to 205° C. This foamable sheet was heated at 185° C. in an oven for 2 minutes. An expansion of the sheet thickness of 2.5 times was observed.

EXAMPLE 2

A foamable metallocene polyethylene sheet was formulated by mixing the following ingredients on a two-roll mill at the roll temperatures of 95–105° C.:

| Ingredients | Parts |
| --- | --- |
| MPE Resin, melt index of 5, density of 0.8700 g/cm$^3$ | 100 |
| Calcium Carbonate | 35 |
| Titanium Dioxide | 7.5 |
| 1,1-Di-(tert-Butylperoxy)-3,3,5-Trimethylcyclohexane | 0.8 |
| Highly Co-Activated Azodicarbonamide | 2.5 |
| Zinc Oxide | 0.6 |
| Zinc Stearate Lubricant (and Activator) | 0.75 |

This foamable sheet was heated at 175° C. in an oven for 1.9 minutes. The same highly co-activated azodicarbonamide was used as in Example 1. An expansion of the sheet thickness of 3 times was observed.

EXAMPLE 3

A foamable metallocene polyethylene sheet was formulated by mixing the following ingredients on a two-roll mill at the roll temperatures of 95–105° C.:

| Ingredients | Parts |
| --- | --- |
| MPE Resin, melt index of 5, density of 0.8700 g/cm$^3$ | 100 |
| Calcium Carbonate | 35 |
| Titanium Dioxide | 7.5 |
| 1,1-Di-(tert-Butylperoxy)-3,3,5-Trimethylcyclohexane | 0.8 |
| Highly Co-Activated Azodicarbonamide | 2.5 |
| Zinc Oxide | 0.5 |
| Zinc Stearate Lubricant (and Activator) | 0.75 |

This foamable sheet was heated at 175° C. in an oven for 1.9 minutes. The same highly co-activated azodicarbonamide was used as in Example 1. An expansion of the sheet thickness of 2.5 times was observed.

EXAMPLE 4

A foamable metallocene polyethylene sheet was formulated by mixing the following ingredients on a two-roll mill at the roll temperatures of 95–105° C.:

| Ingredients | Parts |
| --- | --- |
| MPE Resin, melt index of 5, density of 0.8700 g/cm$^3$ | 80 |
| EVA copolymer | 20 |
| Calcium Carbonate | 35 |
| Titanium Dioxide | 7.5 |
| 1,1-Di-(tert-Butylperoxy)-3,3,5-Trimethylcyclohexane | 0.8 |
| Highly Co-Activated Azodicarbonamide | 2.5 |
| Zinc Oxide | 0.75 |
| Zinc Stearate Lubricant (and Activator) | 0.75 |

The highly co-activated azodicarbonamide is 70% azodicarbonamide by weight and 30% of co-activators. The co-activators are believed to be zinc oxide and a compound other than urea. The average diameter of the highly co-activated azodicarbonamide package was about 4.2 microns as measured with a laser (about 2 or 3 microns using the Fisher measurement). The azo and co-activators were compounded (ground) together. The blowing temperature of this highly co-activated azodicarbonamide package was 175° C. to 220° C. This foamable sheet was heated at 180° C. in a hot air oven for 3 minutes. Some foaming was observed.

Comparative Examples 3 to 7 and Examples 5 to 8 are typical inhibitor ink compositions prepared by stirring all the ingredients together.

COMPARATIVE EXAMPLE 3

| Ingredients | Parts |
| --- | --- |
| Naphtha (non-polar) solvent based ink | 80 |
| Benzotriazole Inhibitor | 20 |

After 45 minute of mixing, the benzotriazole had not dissolved in the ink. In all of the remaining ink composition examples, the inhibitor dissolved in the ink composition.

COMPARATIVE EXAMPLE 4

| Ingredients | Parts |
| --- | --- |
| Naphtha (non-polar) solvent based ink | 75 |
| Tolyltriazole inhibitor | 25 |

COMPARATIVE EXAMPLE 5

| Ingredients | Parts |
| --- | --- |
| Naphtha (non-polar) solvent based ink | 90 |
| Cyclohexyltriazole Inhibitor | 10 |

The cyclohexyltriazole inhibitor was a mixture of 85% cyclohexyltriazole, 5% tolyltriazole, and 10% water.

EXAMPLE 5

| Ingredients | Parts |
| --- | --- |
| Naphtha (non-polar) solvent based ink | 80 |
| Tolyltriazole Derivative Inhibitor | 20 |

The tolyltriazole derivative inhibitor was a liquid inhibitor of N, N-bis(2-ethylhexyl)-ar-methyl-1H-benzotriazole-1-methanamine.

EXAMPLE 6

| Ingredients | Parts |
| --- | --- |
| Naphtha (non-polar) solvent based ink | 80 |
| Triazole Derivative Inhibitor | 20 |

The triazole derivative inhibitor was a liquid inhibitor of N, N-bis(2-ethylhexyl)-1H-1,2,4-triazole-1-methanamine.

COMPARATIVE EXAMPLE 6

| Ingredients | Parts |
| --- | --- |
| Naphtha (non-polar) solvent based ink | 80 |
| Water Soluble Tolyltriazole Derivative Inhibitor | 20 |

The water soluble tolyltriazole derivative inhibitor was a liquid mixture of water and 2,2'-[[(Methyl-1H-benzotriazole-1-yl)methyl]mono]bisethanol.

COMPARATIVE EXAMPLE 7

| Ingredients | Parts |
| --- | --- |
| Vinyl solvent based ink (polar) | 80 |
| Benzotriazole Derivative Inhibitor | 20 |

COMPARATIVE EXAMPLE 8

| Ingredients | Parts |
| --- | --- |
| Vinyl water based ink (polar) | 80 |
| Benzotriazole Derivative Inhibitor | 20 |

EXAMPLES 7 AND 8 AND COMPARATIVE EXAMPLES 9–13

Printing of Inks and Resultant Embossing

The 10-mil foamable metallocene polyethylene sheets of Examples 2 and 3 were calendered on a release paper. The inks prepared in Examples 7 and 8 and Comparative Examples 9–13 were printed on these foamable substrates using a flat-bed gravure proof press. The inks printed and dried satisfactorily without any tack. The printed samples were coated with 10 mils of a clear plastisol and heated at a temperature of 175° C. for 1.9 minutes in a hot air Werner Mathis oven to expand the 10-mil layer to about 22 mils. The clear plastisol formulation was 100 parts PVC resin, 40 parts plasticizers, 4 parts heat stabilizers and 4 parts mineral spirits viscosity modifier.

The thickness of the printed inhibited area was measured in mils and compared to the thickness of the unprinted expanded surrounding areas. This difference is reported as the depth of chemical embossing and is shown in Table I.

TABLE I

| Example | Printed foam sheets | Inhibitor Ink Example | Chemical Embossing Depth in mils | Adhesion to MPE Foamable Layer |
| --- | --- | --- | --- | --- |
| Comp 9 | Example 3 | Comp 4 | 0 | Good |
| Comp 10 | Example 2 | Comp 5 | 0 | Good |
| 7 | Examples 2, 3 | 5 | 9.8 | Good |
| 8 | Example 3 | 6 | 9 | Good |
| Comp 11 | Example 3 | Comp 6 | 0 | Good |
| Comp 12 | Example 3 | Comp 7 | 9.3 | None |
| Comp 13 | Example 3 | Comp 8 | 7.0 | None |

No adhesion was shown between the inhibitor ink and MPE foamable layer in Comparative Examples 12 and 13. Chemical embossing was shown in the metallocene polyethylene foam when alkyl functionalized triazole derivatives were used as inhibitors in Examples 7 and 8 and Comparative Examples 12 and 13. These liquid triazole compounds have the advantage that they can be more easily incorporated in printing ink compositions. They have better compatibility with polyethylene resins, and they have high permeability into the MPE foam layer.

Other triazole compounds, such as 1H-benzotriazole-1-methanol, 1-N,N-di(cyclohexyl triazole methyl)aminopoly (ethylene-propylene) oxide, N-(1H-benzotriazole-1-ylmethyl)formanide, 2-(2H-benzotriazole-2-yl)-4,6-di-tert-pentylphenol, 2-(2H-benzotriazole-2-yl)-4-( 1,1,3,3-tetramethylbutyl)phenol, 1H-benzotriazole-1-ylmethyl isocyanide, were also evaluated as inhibitors. None showed inhibition.

Compared to PVC foam sheets used in typical floor coverings, the crosslinked MPE foam of the present invention has superior toughness and resilience.

We claim:

1. A foamable resin composition comprising a metallocene polyethylene, a nitrogen containing blowing agent, at least one blowing agent activator and a blowing agent inhibitor comprising a compound having the general formula:

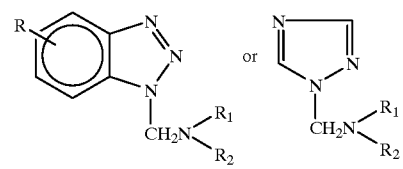

wherein R is hydrogen, one or more aliphatic moieties containing up to 20 carbon atoms, one or more cycloaliphatic moieties containing from 3 to 20 carbon atoms, or one or more aryl or substituted aryl groups containing from 6 to 30 carbon atoms, $R_1$ and $R_2$ are the same or different and each is an aliphatic moiety containing from 2 to 20 carbon atoms, a cycloaliphatic moiety containing from 3 to 20 carbon atoms or an aryl or substituted aryl moiety containing from 6 to 30 carbon atoms.

2. The composition of claim 1, wherein the nitrogen containing blowing agent is azodicarbonamide.

3. The composition of claim 1, wherein the at least one blowing agent activator is selected from citric acid, oxalic acid, p-toluene sulfonic acid, phosphoric acid, potassium carbonate, borax, triethanol amine, zinc chloride, zinc acetate, zinc oxide, zinc stearate, barium stearate, calcium stearate, urea and polyethylene glycol.

4. The composition of claim 1, wherein the at least one blowing agent activator comprises zinc oxide and urea.

5. The composition of claim 1, wherein the nitrogen containing blowing agent and at least one blowing agent activator are compounded together, prior to being added to the metallocene polyethylene.

6. The composition of claim 5, wherein the nitrogen containing blowing agent and at least one blowing agent activator have an average particle size of less than 5 microns, as measured by a laser measuring device.

7. The composition of claim 6, wherein the average particle size is about 4 microns.

8. The composition of claim 1, wherein the nitrogen containing blowing agent in combination with the at least one blowing agent activator has a minimum blowing temperature of less than 185° C. in the absence of a blowing agent inhibitor.

9. The composition of claim 8, wherein the minimum blowing temperature is less than 175° C.

10. The composition of claim 1, wherein the at least one blowing agent activator comprises 10% to 70% by weight of the nitrogen containing blowing agent.

11. The composition of claim 1, wherein the at least one blowing agent activator comprises a first activator and a second activator, and the composition ratio of first activator to the second activator is 2:1 to 1:2 by weight.

12. The composition of claim 11, wherein the composition ratio of first activator to the second activator is about 1:1 by weight.

13. A foamable resin composition comprising a metallocene polyethylene, a blowing agent and a blowing agent inhibitor, the inhibitor being a compound having the general formula

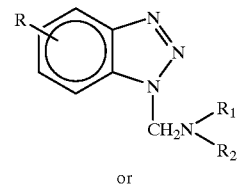

or

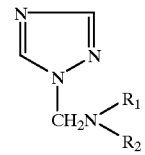

wherein R is hydrogen, one or more aliphatic moieties containing up to 20 carbon atoms, one or more cycloaliphatic moieties containing from 3 to 20 carbon atoms, or one or more aryl or substituted aryl groups containing from 6 to 30 carbon atoms, $R_1$ and $R_2$ are the same or different and each is an aliphatic moiety containing from 2 to 20 carbon atoms, a cycloaliphatic moiety containing from 3 to 20 carbon atoms or an aryl or substituted aryl moiety containing from 6 to 30 carbon atoms.

14. A surface covering comprising the foamable resin of claim 1, wherein the foamable resin has been blown.

15. A surface covering comprising the foamable resin of claim 1, wherein the foamable resin has been blown and a portion of the blowing agent has been inhibited.

16. A surface covering comprising the foamable resin of claim 13, wherein the foamable resin has been blown and a portion of the blowing agent has been inhibited.

* * * * *